US008300556B2

(12) United States Patent
Kalipatnapu et al.

(10) Patent No.: US 8,300,556 B2
(45) Date of Patent: Oct. 30, 2012

(54) OPTIMIZING BANDWIDTH IN A MULTIPOINT VIDEO CONFERENCE

(75) Inventors: Rajah K V R Kalipatnapu, San Jose, CA (US); Rajesh Velliyatt, Sunnyvale, CA (US); Krutarth M. Shah, Fremont, CA (US); Murthy V. Atmakuri, San Jose, CA (US); Khoa T. Tran, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1419 days.

(21) Appl. No.: 11/741,088

(22) Filed: Apr. 27, 2007

(65) Prior Publication Data

US 2008/0267282 A1    Oct. 30, 2008

(51) Int. Cl.
*H04L 12/16* (2006.01)
(52) U.S. Cl. ......................................... 370/260; 370/352
(58) Field of Classification Search .................. 370/260, 370/352
See application file for complete search history.

(56) References Cited

U.S. PATENT DOCUMENTS

| | | | |
|---|---|---|---|
| 4,494,144 A | 1/1985 | Brown | 348/420.1 |
| 5,270,919 A | 12/1993 | Blake et al. | |
| 5,673,256 A | 9/1997 | Maine | |
| 5,801,756 A | 9/1998 | Iizawa | 348/14.11 |
| 6,014,700 A | 1/2000 | Bainbridge et al. | |
| 6,182,110 B1 | 1/2001 | Barroux | |
| 6,606,643 B1 | 8/2003 | Emens et al. | |
| 6,611,503 B1 | 8/2003 | Fitzgerald et al. | 370/260 |
| 6,711,212 B1 | 3/2004 | Lin | 375/240.24 |
| 6,757,277 B1 | 6/2004 | Shaffer et al. | 370/356 |
| 6,775,247 B1 | 8/2004 | Shaffer et al. | 370/260 |
| 6,990,521 B1 | 1/2006 | Ross | |
| 6,999,829 B2 | 2/2006 | Bazzocchi et al. | |
| 7,054,933 B2 | 5/2006 | Baxley et al. | |
| 7,080,105 B2 | 7/2006 | Nakanishi et al. | |
| 7,085,786 B2 | 8/2006 | Carlson et al. | |

(Continued)

FOREIGN PATENT DOCUMENTS

EP    1 517 506 A2    9/2004

(Continued)

OTHER PUBLICATIONS

PCT Notification of Transmittal of the International Search Report and the Written Opinion of the ISA, or the Declaration for PCT/US2008/061120; ISA/EP; 9 pages, Aug. 22, 2008.

(Continued)

*Primary Examiner* — Christopher Brown
(74) *Attorney, Agent, or Firm* — Baker Botts L.L.P.

(57) ABSTRACT

A plurality of multipoint conference units (MCUs) may optimize bandwidth by selecting particular video streams to transmit to endpoints and/or other MCUs participating in a video conference. An endpoint may generate video streams and audio streams and transmit these streams to its managing MCU. During the video conference, an endpoint may also receive and display different video streams and different audio streams. In a particular embodiment, a controlled MCU receives video streams from its managed endpoints, selects potential video streams based upon the maximum number of video streams that any endpoint can display concurrently, and transmits those potential video streams to a master MCU. The master MCU may also receive video streams from its managed endpoints and may select active video streams for transmission to its managed endpoints and to the controlled MCU, which transmits selected streams to its managed endpoints.

26 Claims, 4 Drawing Sheets

U.S. PATENT DOCUMENTS

| | | | |
|---|---|---|---|
| 7,103,664 | B1 | 9/2006 | Novaes et al. |
| 7,184,531 | B2 | 2/2007 | Crouch |
| 7,213,050 | B1 | 5/2007 | Shaffer et |
| 7,313,050 | B2 | 12/2007 | Lee et al. ............... 365/230.06 |
| 2001/0002927 | A1 | 6/2001 | Detampel et al. |
| 2002/0078153 | A1* | 6/2002 | Chung et al. ............... 709/204 |
| 2002/0099682 | A1 | 7/2002 | Stanton ............... 707/1 |
| 2002/0165754 | A1 | 11/2002 | Tang et al. |
| 2003/0023672 | A1 | 1/2003 | Vaysman ............... 709/203 |
| 2004/0015409 | A1 | 1/2004 | Chittenden et al. |
| 2006/0026212 | A1 | 2/2006 | Tsukerman et al. |
| 2006/0041571 | A1 | 2/2006 | Kubokawa ............... 707/101 |
| 2006/0129626 | A1 | 6/2006 | Fitzpatrick ............... 709/200 |
| 2006/0171337 | A1 | 8/2006 | Shaffer et al. ............... 370/261 |
| 2006/0233120 | A1* | 10/2006 | Eshel et al. ............... 370/260 |
| 2007/0083521 | A1 | 4/2007 | Diedrich et al. |
| 2007/0250620 | A1 | 10/2007 | Shah et al. |
| 2007/0299954 | A1 | 12/2007 | Fatula |
| 2008/0266383 | A1 | 10/2008 | Shah et al. ............... 348/14.09 |

FOREIGN PATENT DOCUMENTS

| | | | |
|---|---|---|---|
| WO | WO 02/60126 | * | 1/2002 |
| WO | WO 02/060126 | A1 | 8/2002 |
| WO | WO 02/076030 | | 9/2002 |
| WO | WO 2004/109975 | | 12/2004 |

OTHER PUBLICATIONS

Communication from European Patent Office Application No. 08 746 994.6-1244, 8 pages, dated Jun. 21, 2010 but not received until Jul. 15, 2010.

PCT Notification of Transmittal of the International Search Report and the Written Opinion of the ISA, or the Declaration for PCT/US 2008/061714; ISA/EP; 11 pages, Apr. 28, 2008.

Notification of Transmittal of the International Search Report and the Written Opinion of the International Searching Authority, or the Decleration for PCT/US/07/70563 (ISA/US) 6 pages.

USPTO Office Action for U.S. Appl. No. 11/796,993, in the name of Shah, et al, 13 pages dated Dec. 14, 2012.

Response to Office Action for U.S. Appl. No. 11/796,993, dated Mar. 14, 2012, 14 pages.

Shah, et al., U.S. Appl. No. 11/465,740, filed Aug. 18, 2006 entitled "*System and Method for Optimizing Maintenance of Geographically Distributed Processing Units*" 23 pages.

State IP Office of the People's Republic of China, The First Office Action re Appln. 200880014055.0, Serial No. 2011120600718730 dated Dec. 9, 2011, received on Mar. 22, 2012.

State IP Office of the People's Republic of China, The First Office Action re: Appln. 200880013465.3, dated Dec, 15, 2011, received Apr. 19, 2012.

EP Search Report for Application No. 07798195.9-2221 dated Mar. 21, 2012, 6 pages (received Apr. 19, 2012).

USPTO Office Action for U.S. Appl. No. 11/465,740, filed Aug. 18, 2006, Shah, et al., Office Action dated Feb. 25, 2009, 15 pages.

Response for U.S. Appl. No. 11/465,740, filed Aug. 18, 2006, Shah, et al., dated May 26, 2009, 12 pages.

Notice of Non-Compliant Amendment for U.S. Appl. No. 11/465,740, filed Aug. 18, 2006, Shah, et al., dated Sep. 2, 2009, 3 pages.

Response to Non-Compliant Amendment for U.S. Appl. No. 11/465,740, filed Aug. 18, 2006, Shah, et al., dated Oct. 2, 2009, 12 pages.

USPTO Final Office Action for U.S. Appl. No. 11/465,740, filed Aug. 18, 2006, Shah, et al., dated Jan. 22, 2010, 13 pages.

* cited by examiner

OPTIMIZING BANDWIDTH IN A MULTIPOINT VIDEO CONFERENCE

TECHNICAL FIELD OF THE INVENTION

The present invention relates generally to telecommunications and, more particularly, to optimizing bandwidth in a multipoint video conference.

BACKGROUND OF THE INVENTION

There are many methods available for groups of individuals to engage in conferencing. One common method, video conferencing, involves individuals at a first location engaging in video and audio communications with one or more individuals located in at least one remote location. Video conferences typically require significant bandwidth to accommodate the amount of data transmitted in real-time, especially in comparison to audio conferences.

SUMMARY

In accordance with the present invention, techniques for optimizing bandwidth in a multipoint video conference are provided. According to particular embodiments, these techniques describe a method of reducing the amount of bandwidth used during a video conference by transmitting selected video streams.

According to a particular embodiment, a system for optimizing bandwidth during a video conference comprises a plurality of multipoint conference units (MCUs) each able to facilitate video conferences between two or more participants. The MCUs are also able to facilitate cascaded video conferences comprising participants managed by two or more of the MCUs. The system further comprises a plurality of endpoints participating in a video conference. Each endpoint is able to establish a conference link with a selected one of the MCUs, to generate a plurality of video streams and a corresponding plurality of audio streams, to transmit the generated video streams and the generated audio streams on the conference link, to receive a plurality of video streams and a plurality of audio streams, to present the received audio streams using a plurality of speakers, and to display the received video streams using a plurality of monitors. The system further comprises a controlled MCU of the MCUs managing a first set of the endpoints. The controlled MCU is able: (1) to receive a first set of available video streams comprising the generated video streams from each of the first set of endpoints, (2) to select N potential video streams out of the first set of available video streams, where N equals the maximum number of active video streams that any endpoint is able to display concurrently, and (3) to transmit the potential video streams to a master MCU of the MCUs. The system further comprises the master MCU managing a second set of the endpoints. The master MCU is able: (1) to receive a second set of available video streams comprising the generated video streams from each of the second set of endpoints and the potential video streams from the controlled MCU, (2) to select active video streams out of the second set of available video streams, where the active video streams comprise N primary video streams and M alternate video streams, (3) to determine required ones of the active video streams for delivery to one or more of the first set of the endpoints, and (4) to transmit the required ones of the active video streams to the controlled MCU.

Embodiments of the invention provide various technical advantages. For example, these techniques may reduce the bandwidth required for a multipoint video conference. By reducing bandwidth, additional video conferences may occur at substantially the same time. Also, a video conference that optimizes bandwidth may be initiated and maintained where less bandwidth is available. In certain embodiments, a limited bandwidth connection employs these bandwidth reduction techniques in order to support a high-definition video conference. In some embodiments, by sending only certain video streams out of the total number of available video streams, network traffic and consequent errors may be reduced. Also, in particular embodiments, the processing requirements of a device receiving the video stream(s) are reduced. If fewer video streams are sent, a receiving device may process fewer received video streams.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which.

DETAILED DESCRIPTION OF THE DRAWINGS

Figure 1:
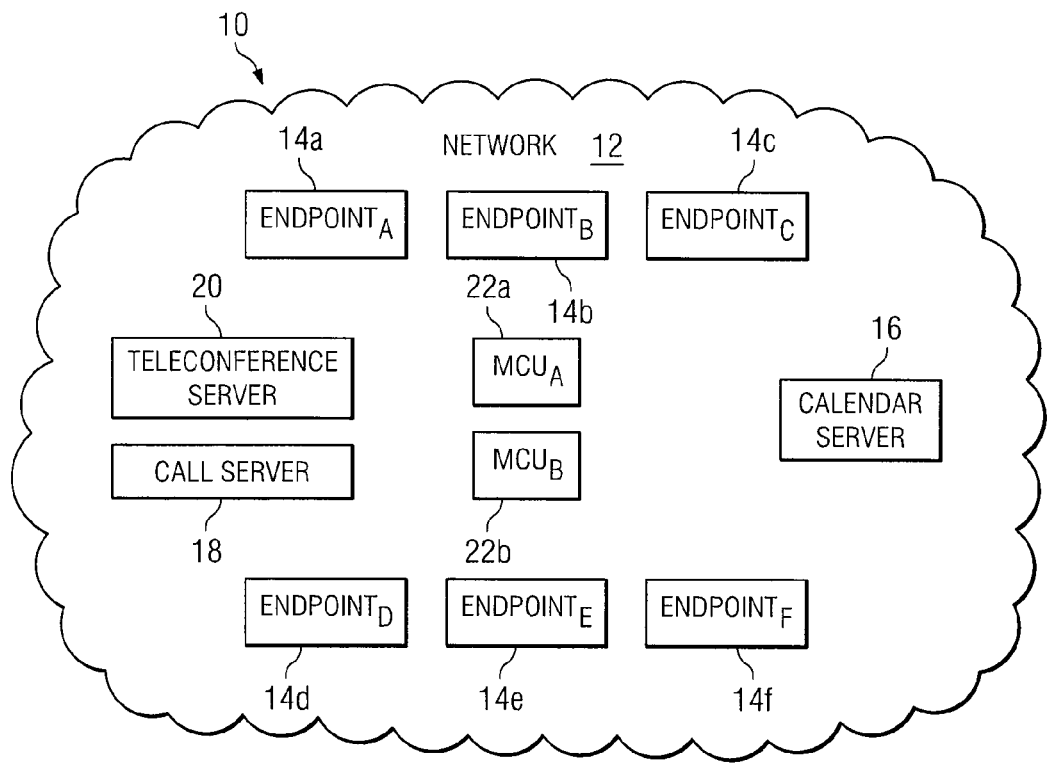
FIG. 1 illustrates a system for optimizing bandwidth in a multipoint video conference.

FIG. 1 illustrates a system, indicated generally at 10, for optimizing bandwidth in a multipoint video conference. As illustrated, video conferencing system 10 includes a network 12. Network 12 includes endpoints 14, a calendar server 16, a call server 18, a teleconference server 20, and multipoint control units (MCUs) 22 (sometimes referred to as a multipoint conference units). In general, elements within video conferencing system 10 interoperate to optimize bandwidth used during a video conference.

In particular embodiments, MCUs 22 may optimize the bandwidth used during a video conference by selecting particular video streams to transmit to endpoints 14 and/or other MCUs 22. In certain embodiments, bandwidth may also be optimized during a video conference when endpoints 14 cease transmission of an unused video stream. For example, if an audio stream indicates no active speakers for a certain period of time, then a managing MCU 22 may instruct the sending endpoint 14 to stop transmitting the corresponding video stream. As another example, rather than receiving an instruction from a managing MCU 22, an endpoint 14 may itself determine that its audio stream does not have an active speaker and temporarily discontinue transmission of the corresponding video stream.

Network 12 interconnects the elements of system 10 and facilitates video conferences between endpoints 14 in video conferencing system 10. Network 12 represents communication equipment including hardware and any appropriate controlling logic for interconnecting elements coupled to or within network 12. Network 12 may include a local area network (LAN), metropolitan area network (MAN), a wide area network (WAN), any other public or private network, a local, regional, or global communication network, an enterprise intranet, other suitable wireline or wireless communication link, or any combination of any suitable network. Network 12 may include any combination of gateways, routers, hubs, switches, access points, base stations, and any other hardware or software implementing suitable protocols and communications.

Endpoints 14 represent telecommunications equipment that supports participation in video conferences. A user of video conferencing system 10 may employ one of endpoints 14 in order to participate in a video conference. Endpoints 14 may include any suitable video conferencing equipment, for example, loud speakers, microphones, speaker phone, displays, cameras, and network interfaces. In the illustrated embodiment, video conferencing system 10 includes six endpoints 14a, 14b, 14c, 14d, 14e, 14f. During a video conference, each participating endpoint 14 may generate one or more audio, video, and/or data streams and may transmit these audio, video, and/or data streams to a managing one of MCUs 22. Endpoints 14 may also generate and transmit a confidence value for each audio stream, where the confidence value indicates a likelihood that the audio stream includes the voice of an active speaker. Each endpoint 14 may also display or project one or more audio, video, and/or data streams received from a managing MCU 22. As described more fully below, MCUs 22 may establish and facilitate a video conference between two or more of endpoints 14.

In particular embodiments, endpoints 14 are configured to generate and display (or project) the same number of audio and video streams. For example, a "single" endpoint 14 may generate one audio stream and one video stream and display one received audio stream and one received video stream. A "double" endpoint 14 may generate two audio streams and two video streams, each stream conveying the sounds or images of one or more users participating in a video conference through that endpoint 14. The double endpoint 14 may also include two video screens and multiple speakers for displaying and presenting multiple video and audio streams. Similarly, an endpoint 14 with a "triple" configuration may contain three video screens, three cameras for generating and transmitting up to three video streams, and three microphone and speaker sets for receiving and projecting audio signals. In certain embodiments, endpoints 14 in video conferencing system 10 include any number of single, double, and triple endpoints 14. Endpoints 14 may generate and display more than three audio and video streams. Also, in particular embodiments, one or more of endpoints 14 may generate a different number of audio, video, and/or data streams than that endpoint 14 is able to display.

Moreover, endpoints 14 may include any suitable components and devices to establish and facilitate a video conference using any suitable protocol techniques or methods. For example, Session Initiation Protocol (SIP) or H.323 may be used. Additionally, endpoints 14 may support and be inoperable with other video systems supporting other standards such as H.261, H.263, and/or H.264, as well as with pure audio telephony devices. While video conferencing system 10 is illustrated as having six endpoints 14, it is understood that video conferencing system 10 may include any suitable number of endpoints 14 in any suitable configuration.

Calendar server 16 allows users to schedule video conferences between one or more endpoints 14. Calendar server 16 may perform calendaring operations, such as receiving video conference requests, storing scheduled video conferences, and providing notifications of scheduled video conferences. In particular embodiments, a user can organize a video conference through calendar server 16 by scheduling a meeting in a calendaring application. The user may access the calendaring application through one of endpoints 14 or through a user's personal computer, cell or work phone, personal digital assistant (PDA) or any appropriate device. Calendar server 16 may allow an organizer to specify various aspects of a scheduled video conference such as other participants in the video conference, the time of the video conference, the duration of the video conference, and any resources required for the video conference. Once a user has scheduled a video conference, calendar server 16 may store the necessary information for the video conference. Calendar server 16 may also remind the organizer of the video conference or provide the organizer with additional information regarding the scheduled video conference.

Call server 18 coordinates the initiation, maintenance, and termination of certain audio, video, and/or data communications in network 12. In particular embodiments, call server 18 facilitates Voice-over-Internet-Protocol (VoIP) communications between endpoints 14. For example, call server 18 may facilitate signaling between endpoints 14 that enables packet-based media stream communications. Call server 18 may maintain any necessary information regarding endpoints 14 or other devices in network 12.

Teleconference server 20 coordinates the initiation, maintenance, and termination of video conferences between endpoints 14 in video conferencing system 10. Teleconference server 20 may access calendar server 16 in order to obtain information regarding scheduled video conferences. Teleconference server 20 may use this information to reserve devices in network 12, such as endpoints 14 and MCUs 22. Teleconference server 20 may reserve various elements in network 12 (e.g., endpoints 14 and MCUs 22) prior to initiation of a video conference and may modify those reservations during the video conference. For example, teleconference server 20 may use information regarding a scheduled video conference to determine that endpoints 14a, 14b, 14e will be reserved from 4:00 p.m. EST until 5:00 p.m. EST for a video conference that will be established and maintained by MCU 22a. Additionally, in particular embodiments, teleconference server 20 is responsible for freeing resources after the video conference is terminated.

Teleconference server 20 may determine which one or more MCUs 22 will establish a video conference and which endpoints 14 will connect to each of the allocated MCUs 22. Teleconference server 20 may also determine a "master" MCU 22 and one or more "controlled" MCUs 22. In particular embodiments, teleconference server 20 selects the master MCU 22 and one or more controlled MCUs 22 for participation in a video conference based on a variety of different factors, e.g., the location of participating endpoints 14, the capacity of one or more MCUs 22, network connectivity, and latency and bandwidth between different devices in network 12. After making the determination of which MCUs 22 will participate in a video conference as the master MCU 22 and controlled MCU(s) 22, teleconference server 20 may send a message to those MCUs 22 informing them of the master and/or controlled designations. This message may be included within other messages sent regarding the video conference. In particular embodiments, the master and controlled MCUs 22 are selected by a different device in video conferencing system 10.

In a particular embodiment, teleconference server 20 allocates MCU 22a and MCU 22b to a video conference involving endpoints 14a, 14b, 14c, 14d, 14e, and 14f. Teleconference server 20 may also determine that MCU 22a will manage endpoints 14a, 14b, 14c while MCU 22b will manage endpoints 14d, 14e, 14f. Teleconference server 20 may also determine the particulars of how MCU 22a and MCU 22b interact and/or connect, e.g., MCU 22a may be designated the master MCU and MCU 22b a controlled MCU. While video conferencing system 10 is illustrated and described as having a particular configuration, it is to be understood that teleconference server 20 may initiate, maintain, and terminate a video conference between any endpoints 14 and any MCUs 22 in video conferencing system 10.

In general, MCUs 22 may establish a video conference, control and manage endpoints 14 during the video conference, and facilitate termination of the video conference. MCUs 22 may manage which endpoints 14 participate in which video conferences and may control video, audio, and/or data streams sent to and from managed endpoints 14.

In particular embodiments, MCUs 22 may optimize bandwidth by selecting certain video stream(s) to send to endpoints 14 and/or other MCUs 22 during a video conference. This may be important, for example, when bandwidth is limited between endpoints 14 and/or MCUs 22. The number of video streams that are selected may be directly related to the maximum number of streams that any one endpoint 14 can concurrently display. In order to select video streams, MCUs 22 may identify one or more policies, which provide guidelines identifying which streams to select. In particular embodiments, teleconference server 20 determines which policy or policies will be used for a particular video conference and sends this information to MCU 22. In certain embodiments, other devices participating in a video conference will select the policy or policies to use and send this information to MCU 22. One policy, for example, may specify that a particular video stream should be displayed at all endpoints 14 participating in the video conference (for example, for a lecture or presentations from one endpoint 14 to all other participating endpoints 14). As a result, MCUs 22 may select at least that particular video stream for transmission to endpoints 14 and/or MCUs 22 involved in the video conference.

As another example, a policy may specify that an active speaker should be displayed at endpoints 14. An active speaker may be a user that is currently communicating (e.g., speaking), or the active speaker may be the last user to communicate. As a result, MCUs 22 may determine one or more active speaker(s) and select the corresponding video stream(s) for transmission to endpoints 14 and/or MCUs 22 involved in the video conference. For example, in order to determine an active speaker, MCU 22a may monitor audio streams received from managed endpoints 14a, 14b, 14c. If endpoints 14a, 14b, and 14c are configured as triples, then MCU 22a monitors and analyzes nine audio streams. In order to determine an active speaker, MCU 22a may evaluate a confidence value associated with each received audio stream. The confidence value may be generated by the sending endpoint 14 and may indicate the likelihood that the audio stream contains audio of an active speaker. Also, MCU 22a may analyze the audio streams to identify any active speakers. If an active speaker is identified in one of the audio streams from endpoint 14b, MCU 22a selects the corresponding video stream for transmission. When endpoints 14 participating in a video conference are configured as singles, doubles, or triples, then MCU 22a may identify three active speakers for transmission to endpoints 14 with up to three video streams. In particular embodiments, MCUs 22 also select one or more alternate active speakers so that an active speaker is not displayed an image of himself. Also, in addition to selecting and transmitting video streams, MCUs 22 may receive audio streams from managed endpoints 14 and forward all, some, or none of those streams to endpoints 14 and MCUs 22 participating in the video conference.

While these particular policies may be described, it is understood that any suitable policy may be employed when selecting particular video streams to transmit during the video conference in order to optimize bandwidth. Additionally, although video conferencing system 10 is illustrated and described as containing two MCUs, it is understood that video conferencing system 10 may include any suitable number of MCUs. For example a third MCU could be connected to MCU 22b. In this example, MCU 22b may interact with the third MCU in a manner similar to managed endpoints 14, and the third MCU may interact with MCU 22b in much the same way as MCU 22a interacts with MCU 22b.

In an example operation, endpoints 14 participate in a video conference by transmitting audio, video, and/or data streams to others of endpoints 14 and receiving streams from other endpoints 14, with MCUs 22 controlling this flow of media. For example, MCU 22a may establish a video conference with endpoints 14a, 14b, 14c and MCU 22b, which may connect endpoints 14d, 14e, 14f to the video conference. MCU 22a may be designated the master MCU while MCU 22b is designated the controlled MCU. MCUs 22a, 22b may send and receive various ones of the audio, video, and/or data streams generated by endpoints 14a, 14b, 14c, 14d, 14e, and 14f. In order to optimize bandwidth, MCU 22b may select particular video streams to transmit to MCU 22a and MCU 22a may select particular video streams to transmit to MCU 22b and to managed endpoints 14. MCUs 22 may also optimize bandwidth by instructing one or more managed endpoints 14 to not transmit a video stream.

In a particular embodiment, endpoints 14a, 14b, 14c, 14d, 14e, 14f have a single configuration and each generate one video stream and are each able to display one received video stream. Also, endpoints 14a, 14b, 14c, 14d, 14e, 14f may each generate one audio stream and receive one aggregated audio stream. The controlled MCU, MCU 22b, may receive three audio streams and three video streams from managed endpoints 14d, 14e, 14f. From these audio streams, MCU 22b may determine an active speaker, select the corresponding video stream, and transmit that video stream to MCU 22a. In particular embodiments, MCU 22b may select and transmit a video stream corresponding to a moderately active speaker, if no active speaker is available. MCU 22b may also transmit the three audio streams corresponding to managed endpoints 14d, 14e, 14f to MCU 22a. The master MCU, MCU 22a, may receive: the video stream from MCU 22b, audio streams from MCU 22b, and a video stream and an audio stream from each of managed endpoints 14a, 14b, 14c. With the six received audio streams, MCU 22a may determine the active speaker of all participating endpoints 14. Alternative, MCU 22a may use only four audio streams (three from managed endpoints 14a, 14b, 14c and one corresponding to the video stream sent by MCU 22b) because MCU 22b has already selected a "winning" audio/video combination from among its managed endpoints 14d, 14e, 14f. MCU 22a may then select the video stream corresponding to the identified active speaker and transmit this video stream to endpoints 14*a*, 14*b*, 14*c* and MCU 22*b*. MCU 22*a* may also aggregate the six received audio streams and transmit an aggregated audio stream to endpoints 14*a*, 14*b*, 14*c* and MCU 22*b*. MCU 22*b*, after receiving this video stream and aggregated audio stream, may transmit this video stream and aggregated audio stream to endpoints 14*d*, 14*e*, 14*f*.

In certain embodiments, MCU 22*a* will select two video streams to ensure that the active speaker does not receive its own video stream. For example, it may be undesirable to display the image of an active speaker to the user who is doing the speaking. Accordingly, MCUs 22 may determine an active speaker and an alternate active speaker. The alternate active speaker may be the previous active speaker (before the current active speaker was selected), or the alternate active speaker may indicate a speaker who is speaking less loudly than the active speaker. While most endpoints 14 receive a video stream corresponding to the active speaker, the endpoint 14 associated with the active speaker may receive a video stream corresponding to the alternate active speaker. For example, MCU 22*b* may select the video stream corresponding to endpoint 14*d* and may send this video stream to MCU 22*a*. After analyzing the received audio streams, MCU 22*a* may determine that endpoint 14*d* contains the active speaker and endpoint 14*a* contains the alternative active speaker, e.g., because endpoint 14*a* was previously the active speaker. MCU 22*a* transmits the video stream corresponding to endpoint 14*d* to managed endpoints 14*a*, 14*b*, 14*c*. To MCU 22*b*, on the other hand, MCU 22*a* transmits the video streams corresponding to both endpoint 14*a* and endpoint 14*d*. MCU 22*b* may then transmit the video stream corresponding to endpoint 14*d* to endpoints 14*e*, 14*f* and may transmit the video stream corresponding to endpoint 14*a* to endpoint 14*d*.

While optimizing bandwidth has been described with respect to endpoints 14 that are configured as single endpoints 14, it is understood that these techniques may be modified and adapted to support video communications systems 10 including any suitable number of single, double, triple, and/or greater numbered endpoints. In particular embodiments, video conferencing systems 10 includes a variety of different types of endpoints 14. In particular embodiments, MCU 22*a* only transmits video stream(s) corresponding to its managed endpoints 14*a*, 14*b*, 14*c* to MCU 22*b* because MCU 22*b* buffers the video streams received by its managed endpoints 14*d*, 14*e*, 14*f*, and, thus, MCU 22*a* need not retransmit those streams to MCU 22*b*. In some embodiments, rather than selecting and transmitting video streams to MCU 22*a*, MCU 22*b* forwards the received audio streams to MCU 22*a* until instructed by MCU 22*a* to send particular video streams.

Particular embodiments of a video conferencing system 10 have been described and are not intended to be all inclusive. While video conferencing system 10 is depicted containing a certain configuration and arrangement of elements and devices, it should be noted that this is a logical depiction and the components and functionality of video conferencing system 10 may be combined, separated, and distributed as appropriate both logically and physically. Also, the functionality of video conferencing system 10 may be provided by any suitable collection and arrangement of components. The functions performed by the elements within video conferencing system 10 may be accomplished by any suitable devices to optimize bandwidth during a video conference.

Figure 2:
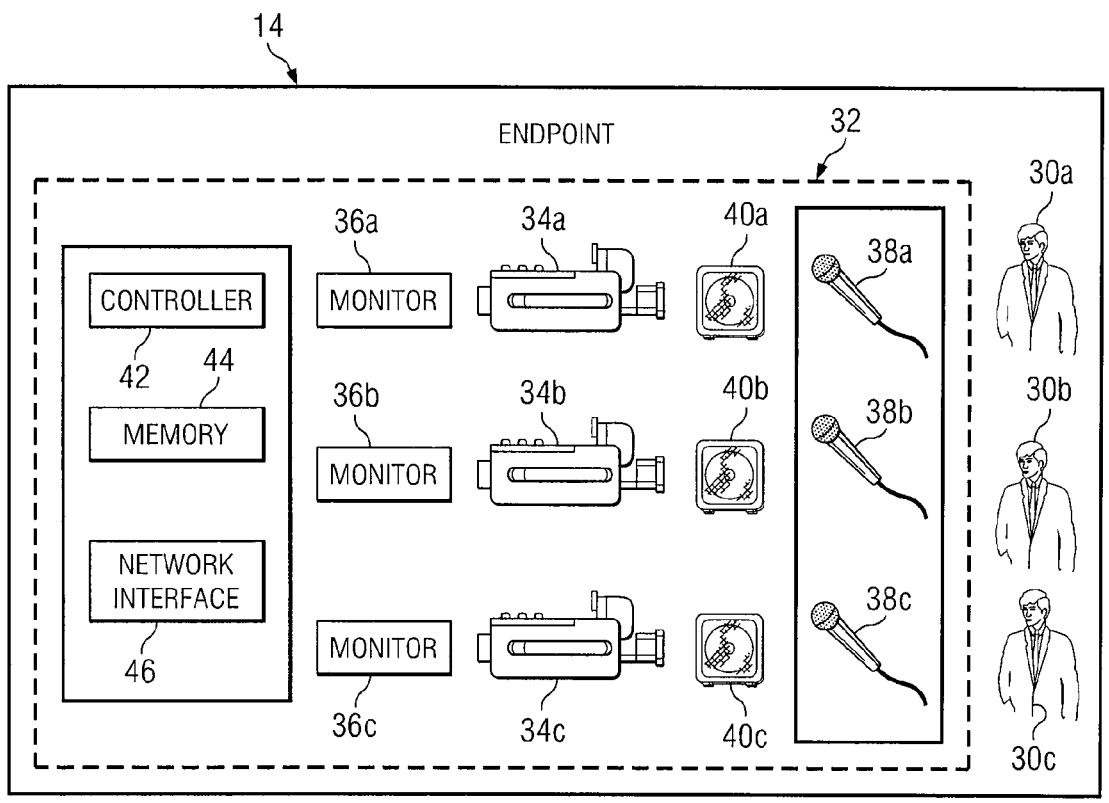
FIG. 2 is a block diagram illustrating an example triple endpoint, which generates three video streams and displays three received video streams.

FIG. 2 is a block diagram illustrating an example triple endpoint 14, which generates three video streams and displays three received video streams. Endpoint 14 may include any suitable number of users 30 that participate in the video conference. In general, video conferencing system 10, through endpoint 14, provides users 30 with a realistic videoconferencing experience even though the number of monitors 36 at a endpoint 14 may be less than the number of video streams generated by other endpoints 14 for the video conference.

User 30 represents one or more individuals or groups of individuals who may be present for a video conference. Users 30 may participate in the video conference using any suitable device and/or component, such as audio Internet Protocol (IP) phones, video phone appliances, personal computer (PC) based video phones, and streaming clients. During the video conference, users 30 may participate in the video conference as speakers or as observers.

Telepresence equipment 32 facilitates the video conferencing among users 30 at different endpoints 14. Telepresence equipment 32 may include any suitable elements and devices to establish and facilitate the video conference. For example, telepresence equipment 32 may include loudspeakers, user interfaces, controllers, microphones, or a speakerphone. In the illustrated embodiment, telepresence equipment 32 includes cameras 34, monitors 36, microphones 38, speakers 40, a controller 42, a memory 44, and a network interface 46.

Cameras 34 and monitors 36 generate and project video streams during a video conference. Cameras 34 may include any suitable hardware and/or software to facilitate capturing an image of one or more users 30 and the surrounding area as well as providing the image to other users 30. Each video signal may be transmitted as a separate video stream (e.g., each camera 34 transmits its own video stream). In particular embodiments, cameras 34 capture and transmit the image of one or more users 30 as a high-definition video signal. Monitors 36 may include any suitable hardware and/or software to facilitate receiving video stream(s) and displaying the received video streams users 30. For example, monitors 36 may include a notebook PC, a wall mounted monitor, a floor mounted monitor, or a free standing monitor. While, as illustrated, endpoint 14 contains one camera 34 and one monitor 36 per user 30, it is understood that endpoint 14 may contain any suitable number of cameras 34 and monitors 36 each associated with any suitable number of users 30.

Microphones 38 and speakers 40 generate and project audio streams during a video conference. Microphones 38 provide for audio input from users 30. Microphones 38 may generate audio streams from noise surrounding each microphone 38. Speakers 40 may include any suitable hardware and/or software to facilitate receiving audio stream(s) and projecting the received audio streams users 30. For example, speakers 40 may include high-fidelity speakers. While, as illustrated, endpoint 14 contains one microphone 38 and one speaker 40 per user 30, it is understood that endpoint 14 may contain any suitable number of microphones 38 and speakers 40 each associated with any suitable number of users 30.

Controller 42 controls the operation and administration of telepresence equipment 32. Controller 42 may process information and signals received from other elements of telepresence equipment 32, such as microphones 38, cameras 34 and network interface 46. Controller 42 may include any suitable hardware, software, and/or logic. For example, controller 42 may be a programmable logic device, a microcontroller, a microprocessor, any suitable processing device, or any combination of the preceding. Memory 44 may store any data or logic used by controller 42 in providing video conference functionality. In some embodiments memory 44 may store all, or a portion, of a video conference. Memory 44 may include any form of volatile or non-volatile memory including, without limitation, magnetic media, optical media, random access memory (RAM), read-only memory (ROM), removable media, or any other suitable local or remote memory component. Network interface 46 may communicate information and signals to and receive information and signals from network 12. Network interface 46 represents any port or connection, real or virtual, including any suitable hardware and/or software that allow telepresence equipment 32 to exchange information and signals with network 12, other telepresence equipment 32, and/or other devices in video conferencing system 10.

When endpoint 14 participates in a video conference, a video stream may be generated by each camera 34 and transmitted to a far end participant of a call. Similarly, endpoint 14 may capture corresponding audio streams using microphones 38 and transmit these audio streams along with the video streams. In the case of a multipoint video conference, the far end participant may be a selected managing MCU 22, and the managing MCU 22 may or may not need one or more of the video streams. For these and similar situations, endpoint 14 may support pausing of transmission of one or more of its video streams. For example, if microphone 38 corresponding to a particular camera 34 has not detected input over a predetermined threshold for a given period of time, MCU 22 may instruct endpoint 14 to cease transmission of the video stream generated by the corresponding camera 34. In response, endpoint 14 may temporarily stop transmitting the video streams. This period of time may be automatically adjusted and may be determined heuristically or with a configurable parameter. Alternatively or additionally, endpoint 14 may on its own determine that its video streams are not needed and may pause transmission unilaterally. If MCU 22 detects that an active speaker likely corresponds to the stopped video stream, MCU 22 may send a start-video message to the appropriate endpoint 14. Alternatively or additionally, endpoint 14 may restart transmission of the video stream after detecting input over the predetermined threshold.

According to particular embodiments, controller 42 monitors input from microphones 38 and assigns confidence values to each input audio stream. For example, endpoint 14 may assign a confidence value from 1 to 10 (or any other suitable range) indicating the likelihood that microphone 38 is receiving intended audio input from the corresponding user(s) 30. To generate these confidence values, endpoint 14 may use any appropriate algorithms and data. For example, endpoints 14 may process received audio input and may even use corresponding video input received from the appropriate camera 34 to determine the likelihood that the corresponding user(s) 30 were intending to provide input. At regular intervals or other appropriate times, endpoint 14 may embed these measured confidence values in its audio streams or otherwise signal these values to a managing MCU 22. In certain embodiments, endpoint 14 transmits a confidence value for each video stream to its managing MCU 22. MCUs 22 may then use these confidence values to help select active audio and video streams, which may be provided to endpoints 14 participating in a video conference.

During a video conference, endpoint 14 may display three video streams on monitors 36 (or more, if a single monitor 36 displays multiple video streams). In particular embodiments, endpoint 14 receives three video streams with an indication of which monitor 36 should display each video stream. As a particular example, consider a video conference between four triple endpoints 14. In this example, the participating endpoints 14 collectively generate twelve video streams. During the conference, MCUs 22 determine which video streams will be displayed by which monitors at the participating endpoints 14. In this example, the three video streams received from each endpoint 14 may be designated as left, center, and right streams. At each participating endpoint 14, monitors 36 will display an active left video stream, an active center video stream, and an active right video stream. This provides a relatively straightforward technique for maintaining spatial consistency of participants.

To avoid forcing an active speaker to view its own video feed, MCUs 22 may select alternate video feeds, such as the previous active video stream. For example, if the left video stream for a participating endpoint 14 is selected as the active stream, MCU 22 may provide an alternate left video stream to that endpoint 14.

If single or double endpoints 14 also participate in a call with triple endpoints 14, MCUs 22 may use appropriate techniques to ensure that video streams from these endpoints 14 maintain spatial consistency. For example, MCUs 22 may ensure that video feeds from a double are always maintained in proper left-right configuration on all displays. However, it should be apparent that video streams from endpoints 14 with less than the maximum number of monitors may be treated differently while still maintaining spatial consistency among participants. For example, the video feed from a single may be placed on the left, center, or right monitor 36 without compromising spatial consistency.

In particular embodiments, a master MCU 22 creates and stores a "virtual table," which maintains the spatial consistency of all users participating in a video conference. Using this virtual table and policies about which video streams to select for transmission, MCUs 22 may determine which monitors 36 display which of the video streams. For example, MCU 22a, using a virtual table, may determine an active speaker for the left monitor 36a, the center monitor 36b, and the right monitor 36c. This can accomplish more sophisticated algorithms for determining the appropriate video feeds for display on the monitors 36 at each endpoint 14. However, system 10 contemplates MCUs 22 using any suitable algorithm for determining which video feeds to display on which monitors 36. For example, system operators may determine that spatial consistency is not important, and MCUs 22 may be configured to completely disregard spatial relationships when selecting and providing video streams.

Also, in certain embodiments, endpoints 14 may divide portions of one or more monitors 36 into separate zones, with each zone functioning as though it were a separate monitor. By dividing a monitor into separate zones, an endpoint 14 may be able to display additional video streams.

Particular embodiments of an endpoint 14 that generates and receives three video streams have been described and are not intended to be all inclusive. It is to be understood that, while endpoint 14 is described as having a triple configuration, endpoints 14 may generate and receive any suitable number of audio and video streams. The numbers of audio streams generated, audio streams received, video streams generated, and video streams received may be different. While endpoint 14 is depicted containing a certain configuration and arrangement of elements and devices, it should be noted that this is a logical depiction and the components and functionality of endpoint 14 may be combined, separated, and distributed as appropriate both logically and physically. For example, endpoint 14 may include any suitable number of cameras 34 and monitors 36 to facilitate a video conference. Moreover, the functionality of endpoint 14 may be provided by any suitable collection and arrangement of components.

Figure 3:
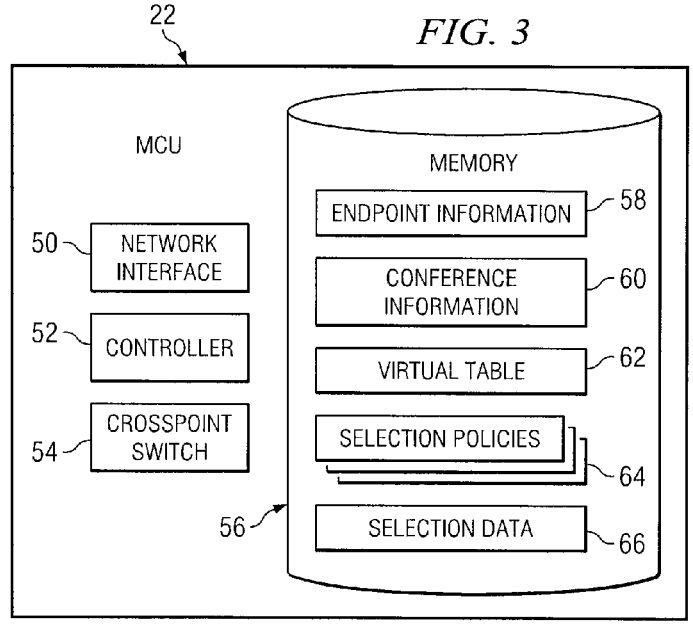
FIG. 3 illustrates a multipoint control unit (MCU) that optimizes bandwidth during a multipoint video conference by selecting certain video streams to transmit to video conference participants.

FIG. 3 illustrates a multipoint control unit (MCU), indicated generally at 22, that optimizes bandwidth during a multipoint video conference by selecting certain video streams to transmit to video conference participants. Video conference participants may include one or more managed endpoints 14 and/or other MCUs 22. In the illustrated embodiment, MCU 22 includes network interface 50, controller 52, crosspoint switch 54, and memory 56.

Network interface 50 supports communications with other elements of video conferencing system 10. Network interface 50 may interface with endpoints 14 and other MCUs 22. In particular embodiments, network interface 50 may comprise a wired ethernet interface. While described and illustrated as a single component within MCU 22, it is understood that this is a logical depiction. Network interface 50 may be comprised of any suitable components, hardware, software, and/or logic for interfacing MCU 22 with other elements of video conferencing system 10 and/or network 12. The term "logic," as used herein, encompasses software, firmware, and computer readable code that may be executed to perform operations.

In general, controller 52 controls the operations and functions of MCU 22. Controller 52 may process information received by MCU 22 through network interface 50. Controller 52 may also access and store information in memory 56 for use during operation. While depicted as a single element in MCU 22, it is understood that the functions of controller 52 may be performed by one or many elements. Controller 52 may have any suitable additional functionality to control the operation of MCU 22.

Crosspoint switch 54 generally allows MCU 22 to receive and to forward packets received from endpoints 14 and/or other MCUs 22 to endpoints 14 and/or other MCUs 22. In particular embodiments, MCU 22 receives packets in video, audio, and/or data streams from one or many endpoints 14 and forwards those packets to another MCU 22. Crosspoint switch 54 may forward particular video streams to endpoints 14 and/or other MCUs 22. In particular embodiments, crosspoint switch 54 determines an active speaker. To determine an active speaker, crosspoint switch 54 may analyze audio streams received from managed endpoints 14 and/or other MCUs 22 to determine which endpoint 14 contains a user that is verbally communicating. In particular embodiments, crosspoint switch 54 evaluates a confidence value associated with each received audio stream in order to determine the active stream(s). Based on the active speaker(s), MCU 22 may select video streams to transmit to managed endpoints 14 and/or other MCUs 22. Crosspoint switch 54 may also aggregate some or all audio streams received from endpoints 14 and/or other MCUs 22. In particular embodiments, crosspoint switch 54 forwards the aggregated audio streams to managed endpoints 14 and other MCUs 22. Crosspoint switch 54 may contain hardware, software, logic, and/or any appropriate circuitry to perform these functions or any other suitable functionality. Additionally, while described as distinct elements within MCU 22, it is understood that network interface 30 and crosspoint switch 54 are logical elements and can be physically implemented as one or many elements in MCU 22.

Memory 56 stores data used by MCU 22. In the illustrated embodiment, memory 56 contains endpoint information 58, conference information 60, a virtual table 62, selection policies 64, and selection data 66.

Endpoint information 58 and conference information 60 may include any suitable information regarding managed endpoints 14 and video conferences involving endpoints 14, respectively. For example, endpoint information 58 may store information regarding the number and type of endpoints 14 assigned to MCU 22 for a particular video conference. Endpoint information 58 may also specify the number of video, audio, and/or data streams, if any, to expect from a particular endpoint 14. Endpoint information 58 may indicate the number of video streams that each endpoint 14 expects to receive. In particular embodiments, when MCU 22 is designated a master MCU for a particular video conference, endpoint information 58 stores information regarding all endpoints 14 participating in the video conference. Conference information 60 may contain information regarding scheduled or ad hoc video conferences that MCU 22 will establish or manage. For example, conference information 60 may include a scheduled start time and duration of a video conference and may include additional resources necessary for the video conference. In particular embodiments, conference information 60 includes information regarding other MCUs 22 that may be participating in a particular video conference. For example, conference information 60 may include a designation of which MCU 22 will operate as a master MCU 22 during the video conference and which (if any) other MCUs 22 will operate as controlled MCUs 22. In particular embodiments, which MCU 22 is designated the master MCU 22 may be modified during the video conference based on any number of factors, e.g., which endpoints 14 connect to the conference, disconnect from the conference, and/or contain the most active speakers. In certain embodiments, the master MCU 22 for a particular video conference has a number of managed endpoints 14 greater than or equal to the number of endpoints 14 managed by any participating, controlled MCU 22. It is to be understood that memory 38 may include any suitable information regarding endpoints 14, MCUs 22, and/or any other elements within video conferencing system 10.

Virtual table 62 maintains the spatial consistency of participants during a video conference. In a particular embodiment, using virtual table 62, MCU 22 ensures that a camera 34*c* on the left side of a particular triple endpoint 14 is always displayed on the left monitor 36*c* of any triple endpoint 14. Assignments to the virtual table may persist for the duration of the video conference. Thus, when more than one monitor is available at an endpoint 14, MCU 22 may use virtual table 62 to ensure that a remote user is displayed on the same monitor throughout the video conference. This may make it easier for users to identify who and where a displayed user is. In particular embodiments, locations at a virtual table represented by virtual table 62 are different for each endpoint 14. For example, while a particular video stream may be displayed on the left monitor 36 of endpoint 14*b*, the same video stream may be displayed on the center monitor of endpoint 14*a*. While described in a particular manner, it is understood that virtual table 62 may specify a virtual "location" for users in any appropriate manner.

MCU 22 may also include one or more selection policies 64. Each selection policy 64 may identify a particular algorithm for selecting video streams to transmit during the video conference. For example, one of selection policies 64 may specify that a particular video stream should be displayed at all endpoints 14 participating in the video conference. As a result, MCUs 22 may select at least that particular video stream for transmission to endpoints 14 and/or MCUs 22 involved in the video conference. This selection policy 64 may be appropriate, for example, when an individual is giving a presentation or when the CEO of a company is addressing employees at a variety of different offices. As another example, a policy may specify that an active speaker or speakers should be displayed at endpoints 14. As a result, MCUs 22 may determine active speaker(s) and select the video stream(s) corresponding to those active speaker(s) for transmission to endpoints 14 and/or MCUs 22 involved in the video conference. MCU 22 may use any suitable means to determine which selection policy or policies 64 to employ.

For example, conference information 60 may identify which one or more selection policies 64 to apply during a particular video conference.

Selection data 66 stores data used by selection policies 64 to determine which video streams to transmit to endpoints 14 and/or other MCUs 22. For example, if the active speaker selection policy 64 is selected, selection data 66 may identify the active speaker(s). In particular embodiments, selection data 66 also specifies the alternate active speaker(s), so that, rather than seeing a video of himself, the current active speaker is shown a video stream corresponding to the alternate active speaker.

In operation, MCU 22, acting as a master MCU, selects particular video streams to transmit to one or more endpoints 14 and/or other MCUs 22 in order to optimize bandwidth usage during a video conference. MCU 22 may identify one or more selection policies 64 to use when selecting video streams during the video conference, e.g., main speaker override and/or active speaker. If the active speaker selection policy 64 is established, MCU 22 may select particular video streams to transmit. In particular embodiments, this selection is based upon the active speakers, alternate active speakers, the location of different speakers in virtual table 62, and any other suitable factors.

MCU 22 may determine the number of video streams to select by determining the largest number of video streams a participating endpoint 14 will simultaneously receive. This information may be stored in endpoint information 58 and/or conference information 60. In certain embodiments, when endpoints 14 are either single, double, or triple endpoints 14, this maximum number of displayed streams is three. In particular embodiments, no endpoint 14 receives a video stream that it generated, so MCU 22 may select up to six video streams for transmission: three active speaker streams and three alternate speaker streams to send to the active speakers. Selection data 66 may store an indication of the current active speakers and last active speakers. For example, where endpoints 14 may receive up to three video streams to be displayed on left, center, and right monitors, selection data 66 may store the active left speaker, alternate left speaker, active center speaker, alternate center speaker, active right speaker, and alternate right speaker.

When a new active speaker is detected, virtual table 62 may be employed to determine the location of the new active speaker. For example, virtual table 62 may specify that certain video streams are positioned in a left, center, or right location. Using virtual table 62, MCU 22 may determine whether the new active speaker becomes the active left speaker, active right speaker, or active center speaker. If virtual table 62 does not specify the location of the new active speaker, then MCU 22 may select a location for the new active speaker. In particular embodiments, MCU 22 puts the new active speaker in the location corresponding to the active speaker (left, center, or right) that has remained quiet for the longest period of time.

Particular embodiments of an MCU 22 have been illustrated and described and are not intended to be all inclusive. While MCU 22 is depicted as containing a certain configuration and arrangement of components, it should be noted that this is a logical depiction, and the components and functionality of MCU 22 may be combined, separated, and distributed as appropriate both logically and physically. The functionality of MCU 22 may be performed by any suitable components to optimize bandwidth during a multipoint video conference.

Figure 4:
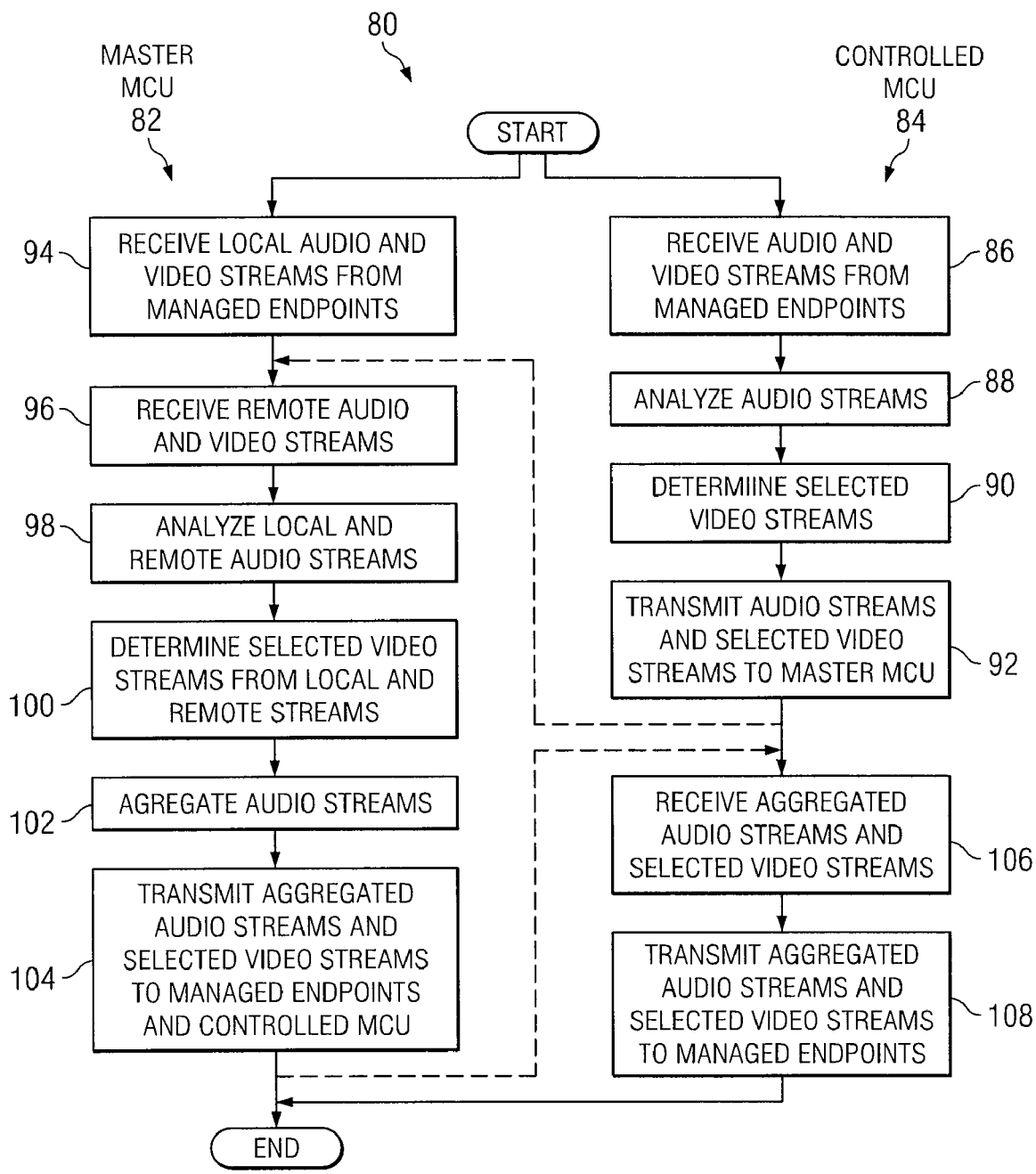
FIG. 4 is a flowchart illustrating methods of optimizing bandwidth performed at a master MCU and at a controlled MCU.

FIG. 4 is a flowchart, indicated generally at 80, illustrating methods of optimizing bandwidth performed at a master MCU 82 and at a controlled MCU 84. In particular embodiments, master MCU 82 and controlled MCU 84 have functionality similar to MCU 22.

At step 86, controlled MCU 84 receives audio, video, and/or data streams from managed endpoints 14. In particular embodiments, MCU 84 receives multiple audio streams and multiple video streams from one or more of managed endpoints 14. At step 88, controlled MCU 84 analyzes the received audio streams and determines selected video streams, in step 90. In particular embodiments, MCU 84 analyzes the received audio streams to identify one or more active speakers. In order to identify the active speaker(s), MCU 84 may evaluate a confidence value associated with each received audio stream. MCU 84 may select video streams corresponding to the current active speaker(s) and/or alternate speaker(s). MCU 84 may base its selection of video streams on the speaker's location in a virtual table. In particular embodiments, MCU 84 determines a number of video streams to select based on the largest number of video streams simultaneously displayed at any one endpoint 14. For example, if only single, double, and triple endpoints 14 are involved in a particular video conference, MCU 84 may select three video streams. At step 92, controlled MCU 84 transmits the selected video streams and the received audio streams to master MCU 82.

At step 94, master MCU 82 receives audio, video, and/or data streams from managed endpoints 14. In particular embodiments, master MCU 82 receives multiple audio streams and multiple video streams from one or more of managed endpoints 14. At step 96, master MCU 82 receives the audio and video streams sent by controlled MCU 84. In particular embodiments, steps 94 and 96 may happen in any suitable order, e.g., steps 94 and 96 may happen in parallel.

At step 98, master MCU 82 analyzes the audio streams received from managed endpoints 14 and from controlled MCU 84. From the received audio streams, master MCU 82 determines selected video streams, in step 100. These selected video streams may include one, many, or none of the video streams received from controlled MCU 84. In particular embodiments, like MCU 84, MCU 82 analyzes the received audio streams to identify one or more active speakers. In order to identify the active speaker(s), MCU 82 may evaluate a confidence value associated with each received audio stream. Master MCU 82 may also select video streams corresponding to current active speakers and/or alternate speakers. MCU 82 may also base its selection of video streams on the location of speakers at the virtual table. This virtual table may be virtual table 62. In particular embodiments, MCU 82 may select up to twice as many video streams as were selected by MCU 84. For example, if MCU 84 transmitted three video streams and all three video streams were selected by MCU 82, then MCU 82 may select an additional three video streams to be displayed at monitors 36 corresponding to the original three active speakers. At step 102, master MCU 82 may aggregate the audio streams. In particular embodiments, MCU 82 aggregates all audio streams received from endpoints 14 and MCU 84. During aggregation, MCU 82 may employ any suitable protocols or techniques to reduce noise, echo, and other undesirable effects in the aggregated audio stream. In certain embodiments, MCU 82 aggregates some combination of the received audio streams. For example, MCU 82 may add particular audio streams or portions thereof to the audio streams corresponding to the selected video streams and may transmit the latter streams for projection with the selected video streams.

At step 104, master MCU 82 transmits the aggregated audio streams and the selected video streams to managed endpoints 14 and controlled MCU 22. In particular embodiments, master MCU 82 transmits different selected video streams to endpoints 14 and controlled MCU 84. For example, master MCU 82 may transmit to controlled MCU 84 three video streams corresponding to active speakers at endpoints 14 managed by MCU 82; however master MCU 82 may transmit an additional video stream to each of the three endpoints 14 which originally sent the selected streams. Accordingly, an endpoint 14 may not receive a video stream originally generated by that endpoint 14. At step 106, controlled MCU 22 receives these audio and video streams and transmits these streams to managed endpoints 14, in step 108. Likewise, controlled MCU 22 may transmit different video streams to different managed endpoints 14 to provide a more desirable user experience at endpoints 14.

The method described with respect to FIG. 4 is merely illustrative and it is understood that the manner of operation and devices indicating as performing the operations may be modified in any appropriate manner. While the method describes particular steps performed in a specific order, it should be understood that video conferencing system 10 contemplates any suitable collection and arrangement of elements performing some, all, or none of the steps in any operable order. As described, master MCU 82 and controlled MCU 84 select video streams to transmit during a video conference in a specific way. It is to be understood that these techniques may be adapted and modified in any suitable manner in order to optimize bandwidth by selecting particular video streams to transmit during a video conference.

Figure 5:
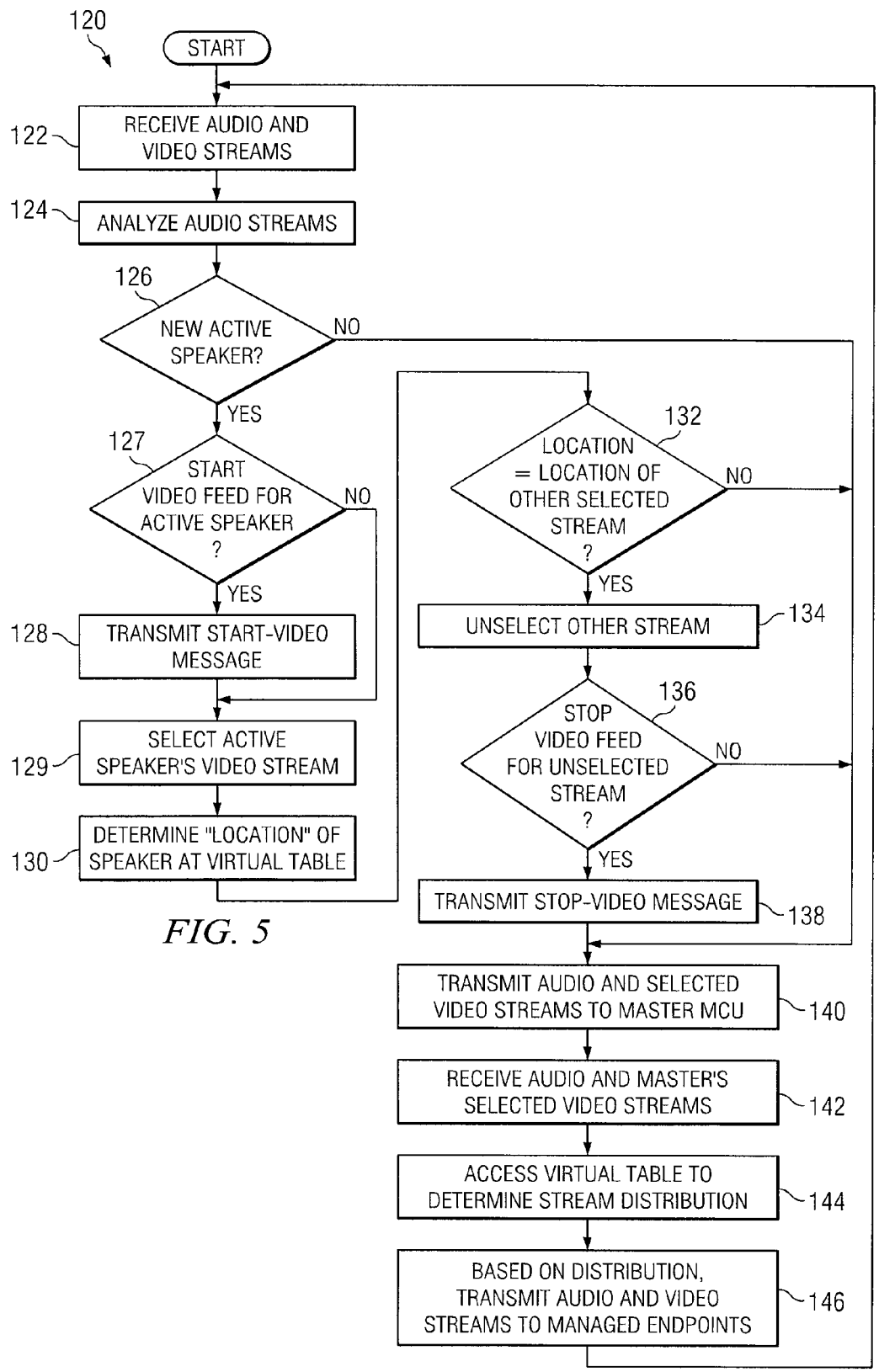
FIG. 5 is a flowchart illustrating a specific method for optimizing bandwidth at an MCU by selecting certain video streams to transmit to video conference participants.

FIG. 5 is a flowchart illustrating a specific method, indicated generally at 120, for optimizing bandwidth at MCU 22 by selecting certain video streams to transmit to video conference participants. In particular embodiments, MCU 22 is a controlled MCU 22.

At step 122, MCU 22 receives audio and video streams from managed endpoints 14. MCU 22 may also receive audio and video streams from another MCU 22 and may process these streams in the same way as if they were received from a managed endpoint 14. In a particular embodiment, MCU 22 manages three endpoints 14d, 14e, 14f, where endpoint 14d has a single configuration and endpoints 14e, 14f have triple configurations. Accordingly, MCU 22 may receive seven audio streams and seven video streams. At step 124, MCU 22 analyzes the received audio streams and determines whether a new active speaker is present, in step 126. MCU 22 may determine which audio streams have a corresponding active speaker. In particular embodiments, MCU 22 analyzes the audio streams by evaluating a confidence value for each audio stream. The confidence value may be determined by an endpoint 14 and may indicate the likelihood that the corresponding audio stream has an active speaker. If no new active speaker is present, then method 120 proceeds to step 140.

At step 127, MCU 22 determines whether the video feed corresponding to the active speaker needs to be started. Starting the video feed may be necessary, for example, when the transmitting endpoint 14 previously received, from the MCU 22, a stop-video message regarding that video stream. A stop-video message may be transmitted to a particular endpoint 14 in step 138, for example. In particular embodiments, instead of MCU 22 transmitting a start-video message, endpoint 14 determines when it should resume transmission of a particular video stream. If the video feed needs to be started, MCU 22 transmits a start-video message in step 128. At step 129, MCU 22 selects the video stream corresponding to the active speaker. For example, if MCU 22 determined that an active speaker was present at the center position of endpoint 14e, then MCU 22 may select the video stream generated by the center position of endpoint 14e. At step 130, MCU 22 determines the "location" of the active speaker at the virtual table. In particular embodiments, MCU 22 accesses virtual table 62 to determine whether the virtual position of the active speaker has been set. If no position is set, then MCU 22 may set the position of the active speaker. If the position has been determined, then MCU 22 identifies this position. For example, if the active speaker is in the center position of endpoint 14e, then MCU 22 may determine that active speaker is in a center position at the virtual table. From this "location," MCU 22 may determine where a video stream corresponding to that active speaker should be displayed at other endpoints 14.

At step 132, MCU 22 determines whether the location of the active speaker is the same as the location of another selected stream. For example, if the center position at endpoint 14e is determined to be the current active speaker, MCU 22 determines whether any other selected video stream corresponds to an active center speaker. If no other selected stream corresponds to that location, then method 120 proceeds to step 140. Otherwise, at step 134, MCU 22 unselects the other video stream. In particular embodiments, MCU 22 may designate this unselected video stream as a alternate active stream. At step 136, MCU 22 determines whether corresponding endpoint 14 should continue to transmit the unselected video stream. MCU 22 may base this determination on the length of time since an active speaker corresponded to the unselected video stream. The threshold for this amount of time may be automatically adjusted, determined heuristically, or determined with a configurable parameter. If the video stream should be stopped, then MCU 22 transmits a stop-video message to the endpoint 14 corresponding to the unselected video stream, in step 138. In particular embodiments, instead of MCU 22 transmitting a stop-video message, endpoint 14 determines when it should no longer transmit that particular video stream(s). In certain embodiments, that endpoint 14 will restart transmission of that particular video stream(s) if it determines that it should restart transmission. For example, if endpoint 14 determines that a confidence value associated with the corresponding audio stream exceeds a threshold, then endpoint 14 may resume transmission of the video stream. As another example, endpoint 14 may determine that an associated camera 34 has detected input over a predetermined threshold and may, in response, restart transmission.

At step 140, a controlled MCU 22 transmits the received audio streams and the selected video streams to a master MCU 22. At step 142, controlled MCU 22 receives one or more audio streams and selected video streams from the master MCU 22. In particular embodiments, the master's selected video streams may include all, some, or none of the video streams selected by the controlled MCU 22. Additionally, controlled MCU 22 may receive aggregated audio stream(s). Each selected video stream may have its own associated audio stream, which may or may not include audio aggregated from one or more other audio streams. At step 144, controlled MCU 22 accesses a virtual table to determine how the received video streams should be distributed to managed endpoints 14. For example, controlled MCU 22 may receive four video streams, three of which correspond to endpoints 14a, 14b, 14c managed by the master MCU 22 and one of which corresponds to the center of endpoint 14e. These video streams may indicate that the center of endpoint 14e is the most recently active speaker and the other three video streams are alternate active speakers at a left, center, and right location at the virtual table. Accordingly, MCU 22 may determine that: endpoint 14d, having a single configuration, should receive the video stream corresponding to the center of endpoint 14e; endpoint 14e, having a triple configuration, should receive the video streams corresponding to the remote endpoints 14a, 14b, 14c left, center, and right locations (so that endpoint 14e does not receive a video stream that it originally generated); and endpoint 14f, having a triple configuration, should receive the video streams corresponding to the center of endpoint 14e and the left and right locations of the remote endpoints 14a, 14b, 14c. Based on the determined distribution, MCU 22 transmits the received audio streams and selected video streams to the managed endpoints 14.

The method described with respect to FIG. 5 is merely illustrative and it is understood that the manner of operation and devices indicating as performing the operations may be modified in any appropriate manner. While the method describes particular steps performed in a specific order, it should be understood that video conferencing system 10 contemplates any suitable collection and arrangement of elements performing some, all, or none of the steps in any operable order. As described, MCU 22 selects video streams to transmit during a video conference in a specific way. It is to be understood that these techniques may be adapted and modified in any suitable manner in order to optimize bandwidth by selecting particular video streams to transmit during a video conference.

Figure 6:
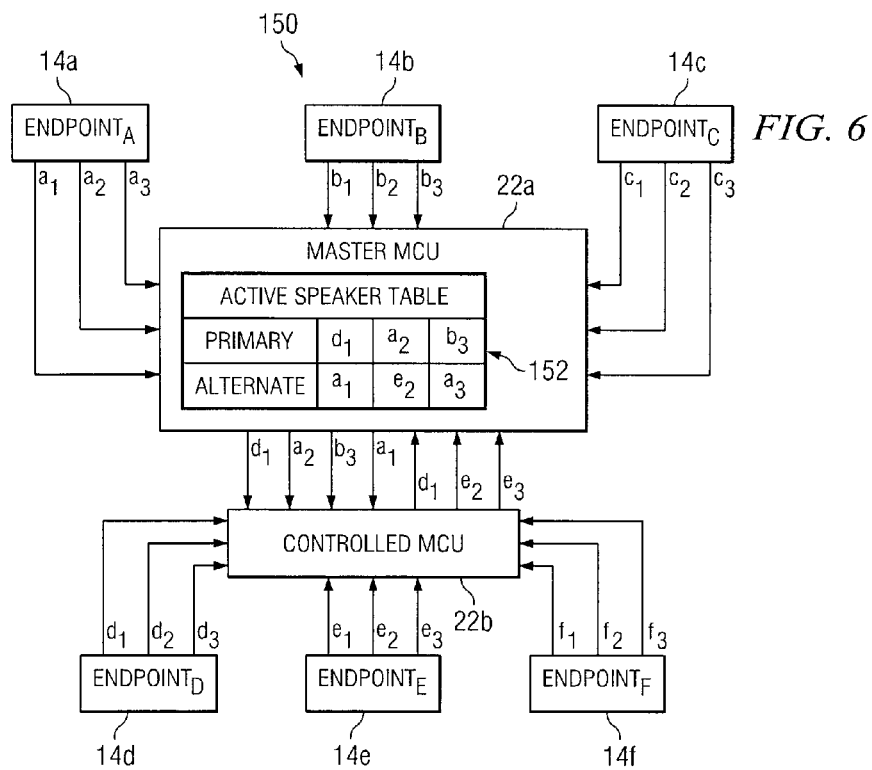
FIG. 6 illustrates an example multipoint video conference that optimizes bandwidth by selecting particular video streams to transmit to endpoints and/or MCUs.

FIG. 6 illustrates an example multipoint video conference, indicated generally at 150, that optimizes bandwidth by selecting particular video streams to transmit to endpoints 14 and/or MCUs 22. As illustrated, multipoint video conference 150 includes six endpoints 14a, 14b, 14c, 14d, 14e, 14f, a master MCU 22a, and a controlled MCU 22b.

As illustrated, endpoints 14 are configured as triples. Accordingly, each endpoint 14 generates three video streams and forwards those three video streams to its managing MCU 22. For example, endpoint 14a generates video streams $a_1$, $a_2$, $a_3$ and forwards those streams to MCU 22a. Likewise, endpoint 14d generates video streams $d_1$, $d_2$, $d_3$ and forwards those streams to MCU 22b. In this example, the three video streams from each endpoint 14 may be designated as left, center, and right, corresponding to a subscript "1," "2," and "3," respectively. At each participating endpoint 14, three monitors 36 display a received left video stream, an center video stream, and an right video stream. While not separately illustrated, each endpoint 14 also generates three audio streams and forwards those three audio streams to its managing MCU 22. Each audio stream is associated with a particular video stream. Endpoints 14 may determine a confidence value associated with each generated audio stream. This confidence value may indicate a likelihood that the audio stream contains an active speaker. In particular embodiments, endpoints 14 transmit these confidence values along with the audio streams to a managing MCU 22.

Controlled MCU 22b may receive nine video streams and nine audio streams from its managed endpoints 14d, 14e, 14f. From the received video streams, MCU 22b determines selected video streams to transmit to master MCU 22a. In certain embodiments, controlled MCU 22b selects up to N video streams, where N is equal to the maximum number of video streams that any endpoint 14 can simultaneously display. In the illustrated embodiment, N is three. While MCU 22b may select up to N video streams, MCU 22b may, under appropriate circumstances, select less than N video streams. For example, if MCU 22b determines (or is informed by MCU 22a) that none of the video streams generated by managed endpoints 14d, 14e, 14f are being displayed at endpoints 14a, 14b, 14c, then MCU 22b may not select or transmit any video streams to MCU 22a and may only transmit corresponding audio streams until otherwise instructed In particular embodiments, MCU 22b selects video streams to transmit to master MCU 22a by identifying any currently active or recently active speaker(s). For example, MCU 22b may analyze the audio streams to determine whether one or more active speakers are present. In particular embodiments, MCU 22b evaluates a confidence value associated with each received audio stream to determine the existence or absence of active speaker(s). MCU 22b may also store selection data similar to selection data 66, which may contain an identification of the last active left, center, and right speakers and an alternate speaker for the left, center, and right positions. For example, MCU 22b may update selection data 66 when a new active or alternate speaker is identified. Based on the stored selection data, MCU 22b may select and transmit the video streams corresponding to the left active speaker, the center active speaker, and the right active speaker to MCU 22a. The alternate left, center, and right active speakers may be maintained for transmission to any managed endpoints 14 that For example, in the illustrated embodiment, MCU 22b selects three (N) video streams: video stream $d_1$ because it likely has an active speaker and video streams $e_2$ and $e_3$ because the selection data indicates that, of the center and right location video streams, these video streams most recently had an audio stream with an active speaker. MCU 22b may also transmit all of the received audio streams to MCU 22a.

Master MCU 22a receives and processes audio and video streams from its managed endpoints 14a, 14b, 14c in a similar way as controlled MCU 22b receives and processes audio and video streams received from its managed endpoints 14d, 14e, 14f. In addition, MCU 22a receives the audio and video streams from MCU 22b. Similar to MCU 22b, MCU 22a determines which video streams to select for transmission to managed endpoints 14a, 14b, 14c and MCU 22b. In certain embodiments, master MCU 22a will select up to 2N video streams, where N is equal to the maximum number of video streams that any endpoint 14 can simultaneously display. Accordingly, in the illustrated embodiment, MCU 22a selects six video streams for transmission to managed endpoints 14 and MCU 22b. While MCU 22a may select up to 2N video streams, MCU 22a, under appropriate circumstances, may select less than 2N video streams.

In order to select the video streams, MCU 22a may analyze the received audio streams to determine whether active speaker(s) are present and may evaluate confidence values associated with the audio streams. In the illustrated embodiment, MCU 22a stores selection data in active speaker table 152. Active speaker table 152 identifies the active speakers "PRIM." and alternative speakers "ALT." for each location at the virtual table, i.e., left, center, and right. As illustrated, active speaker table 152 currently specifies the active left speaker, active center speaker, and active right speaker: $d_1$, $a_2$, and $b_3$. Accordingly, all endpoints 14 except for endpoint 14d will receive the $d_1$ video stream for display on the left screen. Likewise, all endpoints 14 except for endpoint 14a will receive the $a_2$ video stream for display on the center screen, and all endpoints 14 except for endpoint 14b will receive the $b_3$ video stream for display on the right screen. However, as a user may find it undesirable to be displayed a video of himself, active speaker table 152 provides three alternate speakers to select for the active speakers. As illustrated in active speaker table 152, the left screen of endpoint 14d will display the $a_1$ video stream, the center screen of endpoint 14a will display the $e_2$ video stream, and the right screen of endpoint 14b will display the $a_3$ video stream.

Using active speaker table 152, MCU 22a may select video streams and may determine which video streams each managed endpoint 14 and MCU 22b should receive. In the illustrated embodiment, MCU 22a sends to MCU 22b the video streams corresponding to the primary active streams, i.e., $d_1$, $a_2$, and $b_3$. Also, as described above, MCU 22a determines that endpoint 14d will not display the $d_1$ video stream, so MCU 22a transmits an alternate active stream, i.e., $a_1$, to MCU 22b. Accordingly, in the illustrated example, MCU 22a selects four video streams (i.e., N+1) for transmission to MCU 22b. In addition to selecting video streams, MCU 22a may select certain audio streams for transmission and/or aggregate certain audio streams. For example, MCU 22a may select the audio streams corresponding to the selected video streams and transmit these audio streams with their corresponding video streams to MCU 22b and managed endpoint 14. In particular embodiments, MCU 22a includes some of the audio corresponding to the unselected video streams into the audio streams corresponding to the selected video streams.

Bandwidth usage between MCU 22a and MCU 22b may be optimized by transmitting N video streams from MCU 22b to MCU 22a. In the illustrated embodiment, MCU 22b receives nine video streams and transmits to MCU 22a only the three video streams that are likely to be used in the video conference. Additionally, MCU 22b may transmit fewer than N video streams to MCU 22a. For example, MCU 22a could instruct MCU 22b to cease transmission of the $e_1$ video stream because that video stream is not ultimately transmitted to any participating endpoints 14. In particular embodiments, a controlled MCU 22b transmits audio streams and zero video streams to the master MCU 22a until MCU 22a instructs MCU 22b to transmit one or more particular video streams. MCU 22a may also optimize bandwidth usage by determining which video streams will be displayed by endpoints 14 managed by MCU 22b and transmitting only those video streams to MCU 22b.

Moreover, bandwidth usage between MCU 22b and managed endpoints 14d, 14e, 14f, for example, may be optimized when the managed endpoints 14d, 14e, 14f cease transmission of some video streams that are not selected by MCU 22b. In particular embodiments, MCU 22b sends a stop-video message specifying a particular video stream to an endpoint 14 when the corresponding audio stream has not had an active speaker for a threshold period of time. This period of time may be automatically adjusted and may be determined heuristically or with a configurable parameter. For example, once five minutes have elapsed since the audio stream corresponding to $d_3$ indicated an active speaker, MCU 22b may instruct endpoint 14d to cease transmission of the video stream corresponding to $d_3$. Endpoint 14d may continue to transmit the audio stream corresponding to $d_3$ and may restart transmission of the corresponding video stream when it becomes appropriate. In particular embodiments, MCU 22b transmits a start-video message to a managed endpoint 14 instructing the managed endpoint 14 to resume transmission of the video stream when MCU 22b determines that an active speaker is associate with that video stream. In certain embodiments, the particular endpoint 14 restarts transmission when the confidence value associated with the corresponding audio stream indicates the presence of an active speaker. Bandwidth usage between MCU 22a and its managed endpoints 14a, 14b, 14c may be optimized using similar techniques.

A particular example of a multipoint video conference 150 has been described and is not intended to be inclusive. While multipoint video conference 150 is depicted as containing a certain configuration and arrangement of elements, it should be noted that this is a just an example and a video conference may contain any suitable collection and arrangement of elements performing all, some, or none of the above mentioned functions.

Although the present invention has been described in several embodiments, a myriad of changes and modifications may be suggested to one skilled in the art, and it is intended that the present invention encompass such changes and modifications as fall within the present appended claims.

What is claimed is:

1. A system for optimizing bandwidth during a video conference comprising:
   a plurality of multipoint conference units (MCUs) each operable to facilitate video conferences between two or more participants, the MCUs further operable to facilitate cascaded video conferences comprising participants managed by two or more of the MCUs;
   a plurality of endpoints participating in a video conference, each endpoint operable to establish a conference link with a selected one of the MCUs, to generate a plurality of video streams and a corresponding plurality of audio streams, to transmit the generated video streams and the generated audio streams on the conference link, to receive a plurality of video streams and a plurality of audio streams, to present the received audio streams using a plurality of speakers, and to display the received video streams using a plurality of monitors;
   a controlled MCU of the MCUs managing a first set of the endpoints, the controlled MCU operable:
     to receive a first set of available video streams comprising the generated video streams from each of the first set of endpoints;
     to select N potential video streams out of the first set of available video streams, wherein N equals the maximum number of active video streams that any endpoint is able to display concurrently; and
     to transmit the potential video streams to a master MCU of the MCUs; and
   the master MCU managing a second set of the endpoints, the master MCU operable:
     to receive a second set of available video streams comprising the generated video streams from each of the second set of endpoints and the potential video streams from the controlled MCU;
     to select active video streams out of the second set of available video streams, the active video streams comprising N primary video streams and M alternate video streams;
     to determine required ones of the active video streams for delivery to one or more of the first set of the endpoints; and
     to transmit the required ones of the active video streams to the controlled MCU.

2. The system of claim 1, wherein the required ones of the active video streams consist of the active streams generated by the second set of endpoints.

3. The system of claim 1, wherein:
   the required ones of the active video streams comprise the N primary video streams; and
   if any of the primary video streams are generated by the first set of endpoints, then the required ones further comprise one or more of the M alternate video streams.

4. The system of claim 1, wherein the controlled MCU and the master MCU are each further operable to:
   for each primary video stream, to transmit the primary video stream to each endpoint that did not generate the primary video stream; and for each managed endpoint that generated L of the primary streams, to transmit L of the alternate video streams to that managed endpoint.

5. The system of claim 1, wherein selecting N potential video streams out of the first set of available video streams comprises:
for each available video stream in the first set of available video streams, identifying a confidence value associated with an audio stream corresponding to the available video stream, the confidence value indicating a likelihood that the corresponding audio stream is associated with an active speaker; and
selecting the N available video streams with confidence values that indicate the highest likelihoods.

6. The system of claim 1, wherein the controlled MCU and the master MCU are each further operable:
to determine that a period of time has elapsed since a particular audio stream was associated with an active speaker, the particular audio stream corresponding to a particular video stream generated by a particular endpoint; and
in response to the determination, to transmit a stop-video message to the particular endpoint, the stop-video message instructing the particular endpoint to discontinue transmission of the particular video stream.

7. The system of claim 1, wherein M equals N.

8. The system of claim 1, further comprising:
one or more single endpoints participating in the video conference, each single endpoint operable to generate one video stream and one audio stream and to receive one video stream and one audio stream;
wherein the plurality of endpoints comprises one or more double endpoints and one or more triple endpoints, each double endpoint operable to generate two video streams and two audio streams and to receive two video streams and two audio streams, each triple endpoint operable to generate three video streams and three audio streams and to receive three video streams and three audio streams.

9. The system of claim 1, wherein at least one of the plurality of monitors is operable to display a plurality of the received video streams.

10. The system of claim 1, further comprising a teleconference server operable:
to select the master MCU and the controlled MCU from the plurality of MCUs; and
to transmit a message to the controlled MCU, the message identifying the master MCU.

11. A multipoint conference unit (MCU) for optimizing bandwidth during a video conference comprising a controller operable:
in a first mode of operation:
to facilitate a video conference as a controlled MCU managing a first set of a plurality of endpoints participating in the video conference, each endpoint operable to generate a plurality of video streams and a corresponding plurality of audio streams and to receive a different plurality of video streams and a different plurality of audio streams;
to receive a first set of available video streams comprising the generated video streams from each of the first set of endpoints;
to select N potential video streams out of the first set of available video streams, wherein N equals the maximum number of active video streams that any endpoint is able to display concurrently; and
to transmit the potential video streams to a master MCU; and
the controller further operable, in a second mode of operation:
to facilitate the video conference as the master MCU managing a second set of the endpoints;
to receive a second set of available video streams comprising the generated video streams from each of the second set of endpoints and the potential video streams from the controlled MCU;
to select active video streams out of the second set of available video streams, the active video streams comprising N primary video streams and M alternate video streams;
to determine required ones of the active video streams for delivery to one or more of the first set of the endpoints; and
to transmit the required ones of the active video streams to the controlled MCU.

12. The MCU of claim 11, wherein the required ones of the active video streams consist of the active streams generated by the second set of endpoints.

13. The MCU of claim 11, wherein:
the required ones of the active video streams comprise the N primary video streams; and
if any of the primary video streams are generated by the first set of endpoints, then the required ones further comprise one or more of the M alternate video streams.

14. The MCU of claim 11, wherein the controller is further operable to:
for each primary video stream, to transmit the primary video stream to each endpoint that did not generate the primary video stream; and
for each managed endpoint that generated L of the primary streams, to transmit L of the alternate video streams to that managed endpoint.

15. The MCU of claim 11, wherein selecting N potential video streams out of the first set of available video streams comprises:
for each available video stream in the first set of available video streams, identifying a confidence value associated with an audio stream corresponding to the available video stream, the confidence value indicating a likelihood that the corresponding audio stream is associated with an active speaker; and
selecting the N available video streams with confidence values that indicate the highest likelihoods.

16. A method for optimizing bandwidth during a video conference comprising:
in a first mode of operation:
facilitating a video conference as a controlled MCU managing a first set of a plurality of endpoints participating in the video conference, each endpoint operable to generate a plurality of video streams and a corresponding plurality of audio streams and to receive a different plurality of video streams and a different plurality of audio streams;
receiving a first set of available video streams comprising the generated video streams from each of the first set of endpoints;
selecting N potential video streams out of the first set of available video streams, wherein N equals the maximum number of active video streams that any endpoint is able to display concurrently; and
transmitting the potential video streams to a master MCU; and in a second mode of operation:
 facilitating the video conference as the master MCU managing a second set of the endpoints;
 receiving a second set of available video streams comprising the generated video streams from each of the second set of endpoints and the potential video streams from the controlled MCU;
 selecting active video streams out of the second set of available video streams, the active video streams comprising N primary video streams and M alternate video streams;
 determining required ones of the active video streams for delivery to one or more of the first set of the endpoints; and
 transmitting the required ones of the active video streams to the controlled MCU.

17. The method of claim 16, wherein the required ones of the active video streams consist of the active streams generated by the second set of endpoints.

18. The method of claim 16, wherein:
 the required ones of the active video streams comprise the N primary video streams; and
 if any of the primary video streams are generated by the first set of endpoints, then the required ones further comprise one or more of the M alternate video streams.

19. The method of claim 16, further comprising:
 for each primary video stream, transmitting the primary video stream to each endpoint that did not generate the primary video stream; and
 for each managed endpoint that generated L of the primary streams, transmitting L of the alternate video streams to that managed endpoint.

20. The method of claim 16, wherein selecting N potential video streams out of the first set of available video streams comprises:
 for each available video stream in the first set of available video streams, identifying a confidence value associated with an audio stream corresponding to the available video stream, the confidence value indicating a likelihood that the corresponding audio stream is associated with an active speaker; and
 selecting the N available video streams with confidence values that indicate the highest likelihoods.

21. Logic for optimizing bandwidth during a video conference, the logic encoded in non-transitory computer readable media and operable when executed to:
 in a first mode of operation:
  facilitate a video conference as a controlled MCU managing a first set of a plurality of endpoints participating in the video conference, each endpoint operable to generate a plurality of video streams and a corresponding plurality of audio streams and to receive a different plurality of video streams and a different plurality of audio streams;
  receive a first set of available video streams comprising the generated video streams from each of the first set of endpoints;
  select N potential video streams out of the first set of available video streams, wherein N equals the maximum number of active video streams that any endpoint is able to display concurrently; and
  transmit the potential video streams to a master MCU; and
 in a second mode of operation:
  facilitate the video conference as the master MCU managing a second set of the endpoints;
  receive a second set of available video streams comprising the generated video streams from each of the second set of endpoints and the potential video streams from the controlled MCU;
  select active video streams out of the second set of available video streams, the active video streams comprising N primary video streams and M alternate video streams;
  determine required ones of the active video streams for delivery to one or more of the first set of the endpoints; and
  transmit the required ones of the active video streams to the controlled MCU.

22. The logic of claim 21, wherein the required ones of the active video streams consist of the active streams generated by the second set of endpoints.

23. The logic of claim 21, wherein:
 the required ones of the active video streams comprise the N primary video streams; and
 if any of the primary video streams are generated by the first set of endpoints, then the required ones further comprise one or more of the M alternate video streams.

24. The logic of claim 21, further operable to:
 for each primary video stream, transmit the primary video stream to each endpoint that did not generate the primary video stream; and
 for each managed endpoint that generated L of the primary streams, transmit L of the alternate video streams to that managed endpoint.

25. The logic of claim 21, wherein selecting N potential video streams out of the first set of available video streams comprises:
 for each available video stream in the first set of available video streams, identifying a confidence value associated with an audio stream corresponding to the available video stream, the confidence value indicating a likelihood that the audio stream is associated with an active speaker; and
 selecting the N available video streams with confidence values that indicate the highest likelihoods.

26. A system for optimizing bandwidth during a video conference comprising:
 in a first mode of operation:
  means for facilitating a video conference as a controlled MCU managing a first set of a plurality of endpoints participating in the video conference, each endpoint operable to generate a plurality of video streams and a corresponding plurality of audio streams and to receive a different plurality of video streams and a different plurality of audio streams;
  means for receiving a first set of available video streams comprising the generated video streams from each of the first set of endpoints;
  means for selecting N potential video streams out of the first set of available video streams, wherein N equals the maximum number of active video streams that any endpoint is able to display concurrently; and
  means for transmitting the potential video streams to a master MCU; and
 in a second mode of operation:
  means for facilitating the video conference as the master MCU managing a second set of the endpoints;
  means for receiving a second set of available video streams comprising the generated video streams from each of the second set of endpoints and the potential video streams from the controlled MCU;

means for selecting active video streams out of the second set of available video streams, the active video streams comprising N primary video streams and M alternate video streams;

means for determining required ones of the active video streams for delivery to one or more of the first set of the endpoints; and means for transmitting the required ones of the active video streams to the controlled MCU.

* * * * *